Patented May 2, 1950

2,506,537

UNITED STATES PATENT OFFICE 2,506,537

REVERSIBLE GEL COMPOSITION

Carl E. Barnes, Pipersville, and William O. Ney, Jr., Easton, Pa., assignors to General Aniline & Film Corporation, New York, N. Y., a corporation of Delaware No Drawing. Application October 22, 1948, Serial No. 56,056

5 Claims. (Cl. 260—29.6)

This invention relates to the preparation of thermal-reversible gels by gelling polyvinyl alcohol in aqueous solution with an interpolymerization product of an acrylic acid or an α-substituted acrylic acid with their amides.

This application is a continuation-in-part of our copending U. S. patent application, Serial No. 560,361, filed October 25, 1944, and now abandoned.

Polyvinyl alcohol is a water-soluble substance which under ordinary conditions does not show or have the properties of gelation. Thus, it cannot be used under those conditions where it comes into any prolonged contact with water since it is dissolved.

Accordingly, it is among the objects of our invention to prepare a polyvinyl alcohol composition which is convertible into a rigid aqua-gel having thermal-reversible properties, and which can be repeatedly treated with water and various aqueous solutions without dissolving. Another object is to prepare a product from synthetic substances which can be used in place of gelatin and similar natural products. By "thermal-reversible" we mean that the gel which we form is converted into a liquid upon heating, but upon cooling, again forms a gel.

Various agents already have been proposed for converting polyvinyl alcohols into reversible gels. Thus, in Patent No. 2,234,186, o-hydroxy benzoyl aromatic ketones are proposed as a gelling agent. In Patent No. 2,249,536, unsubstituted polyhydric phenols, unsubstituted α-naphthol and the unsubstituted dihydric-naphthols are proposed for this purpose. Patent No. 2,249,537 discloses the use of alkali metal salts of certain aromatic amide type compounds as gelling agents, while in Patent No. 2,249,538 there is disclosed the use of 2-4-dihydroxy benzoic acid, 4-chlor resorcinol, gallic acid and the substituted monohydric naphthols.

We have found that when polyvinyl alcohol is mixed with the proper amount, herein called a gelling amount, of the interpolymerization product of an acrylic acid and α-substituted acrylic acids with their amides that the polyvinyl alcohol forms a gel which is tough, firm, strong and thermal-reversible.

By the term "polyvinyl alcohol," as used in the specification and claims, we refer to polyvinyl alcohol polymers which are water-soluble. We also include polymers which are entirely composed of vinyl alcohol units as well as polymers which contain not only vinyl alcohol units, but vinyl ester units, such as vinyl acetate, propionate, butyrate, polyvinyl propionaldehyde acetals and polyvinyl butyraldehyde acetals, and vinyl ethers, such as vinyl-methyl, -ethyl, -propyl, -isopropyl, and other vinyl-alkyl and -aryl ethers.

The exact properties of the gels obtained are determined in part by the ratio of the free acid to amide in the polymerization mixture from which our interpolymerization product is obtained. Thus, the interpolymer contains, by weight, at least 25% of the free acrylic acid component, and at least 25% of the acrylic acid amide component.

The properties are further determined by the pH of the aqueous medium as well as the presence or absence of certain metal ions, such as the alkali and alkaline earth metal salts of the polymeric substance. In general, the pH of the aqueous medium can range from 4 to 9. However, the preferred pH range to produce desirable gelling properties for various compositions of methacrylic acid and methacrylic amide interpolymers with a polyvinyl alcohol is indicated in the following table. The parts are by weight.

| Composition of Interpolymer | | Preferred pH Range |
|---|---|---|
| Acid | Amide | |
| 25 | 75 | 4.5–7.0 |
| 50 | 50 | 5.0–6.5 |
| 75 | 25 | 6.0–6.5 |

The addition of metal ions, such as aluminum and chromium tends to reduce the solubility and harden the gel.

The properties of the gel may be further varied through wide ranges by the incorporation into the polymer molecule of other interpolymerizable vinyl compounds, as for example, esters of acrylic acid or vinyl esters in the polymer molecule, such as vinyl acetate or acrylic acid methyl ester. Such interpolymerizable vinyl compounds are employed in amounts which are less than the combined amounts of the free acrylic acid component and the acrylic acid amide component, and preferably less than the respective amounts of either of said components. The strength of the gel and the tendency to form gel structures may be increased by increasing the proportion of certain groups in the interpolymer components which exhibit strong attractive forces, such as hydroxyl, amino, amide, formyl, carboxyl, nitrile and other polar groups.

The viscosity of solutions of given strength may be controlled in part by varying the polymerization conditions by well known methods to increase or decrease the molecular weight of the polymer, such as by increasing the amounts of the monomers, the temperature of polymerization and the amount of the catalyst used in producing the interpolymer. The viscosity, as well as the tendency to form gels, may also be increased by certain after-treatments of the polymer. For example, if the polymer is one containing free carboxyl groups, then these may be partially esterified with a polyhydric alcohol, such as ethylene glycol or glycerol. If the polymer contains hydroxyl groups, esterification with a polybasic acid produces a similar effect.

The following examples illustrate the preparaion of the interpolymerization product which is useful as a gelling agent for preparing polyvinyl alcohol thermal-reversible gels.

*Example 1*

20 grams each of methacrylic acid and methacrylamide are dissolved in 100 cc. of distilled water and 0.1 gram of benzoyl peroxide is added as a catalyst. The mixture is heated to about 70-90° C. for approximately one-half hour after which time a water-insoluble polymer has precipitated.

*Example 2*

15 grams of methacrylic acid, 15 grams of methacrylamide, and 5 grams of methyl acrylate are added to 100 cc. of distilled water and 0.1 gram of benzoyl peroxide is introduced as a polymerization catalyst. Upon heating to 60° C., or higher, a homogeneous solution is obtained which polymerizes to form a water-insoluble product.

*Example 3*

40 grams each of methacrylic acid and methylacrylamide are added to 300 cc. of water in the presence of 0.1 gram of benzoyl peroxide. The mixture is heated for several hours at 85-90° C. until slight precipitation and an increase in viscosity occurs. Then 300 cc. of water is added and the heating is continued at the same temperature until a further increase in viscosity occurs. Then an additional 300 cc. of water is added and the heating continued until a gel-like material is formed.

This product is dissolved in twice its weight of 0.2 N-sodium hydroxide solution at room temperature and the material precipitated from its solution by adding 0.2 N-sulfuric acid. The filtered material may be washed with organic solvents, such as acetone to remove any residual catalyst if desired, which, if present, may fog a photographic emulsion.

The washed material is then dissolved in 0.2 N-sodium hydroxide and brought to a pH of from 6-7, by addition of dilute solution of any suitable acid, as for example, sulfuric acid, acetic or methacrylic acid. The solution sets to a thermal-reversible gel.

The following are examples illustrative of the use of the products prepared according to Examples 1, 2, and 3 for the preparation of thermal-reversible polyvinyl alcohol gels.

*Example 4*

An 8% solution in water of the polymer prepared according to Example 1 is made as follows: The polymeric product is dissolved in hot water which is made slightly alkaline by the addition of a few drops of a 5% sodium hydroxide of ammonium solution so that the resulting polymer solution has a pH of from about 5-6.5. There is then stirred into this solution an equal amount of an 8% solution of polyvinyl alcohol, while maintaining the pH within the aforesaid range, and the two are mixed at a temperature of about 40-50° C. On cooling, the mixture was found to set to a gel at 30-40° C. The gel is thermal-reversible, unlike solutions of polyvinyl alcohol alone, which, as pointed out above, do not gel.

*Example 5*

An 8% solution of the interpolymerization product obtained according to the process of Example 2 is prepared by dissolving the polymer in hot water made slightly alkaline by the addition of a few drops of a 5% solution of either sodium hydroxide or ammonium hydroxide, so that the resulting polymer solution has a pH of about 5-6.5. Into this solution, there is then introduced an equal amount of an 8% solution of polyvinyl alcohol, while maintaining the pH within the aforesaid range, and the mixture is stirred at about 40-50° C. The solution was allowed to stand and in a short time, after cooling, it set to a gel which is thermal-reversible. The gel formed was tougher than that described in Example 3.

*Example 6*

To a 3% solution of the polymer made according to Example 3, there is added an equal amount of a 10% solution of polyvinyl alcohol, while maintaining the pH at 6-7, and the mixture is stirred at a temperature of about 40-50° C. On cooling, the mixture sets to a thermal-reversible gel.

The amount of the interpolymeric gelling agent added may be varied depending upon the various conditions of treatment. In general, the weight ratio of the acrylic acid-acrylamide interpolymer to polyvinyl alcohol can vary from 1:9 to 9:1. With higher viscosity polyvinyl alcohols it has been found that the proportion of a gelling agent can be less than in the case when lower viscosity polyvinyl alcohols are to be gelled. Likewise, when gels are to be made at lower temperatures, we generally have found that gelling may be produced with smaller amounts of the gelling agents. Depending on the hardness or firmness desired for the gel, the necessary proportion of gelling agent can also be varied within the range specified above.

Either more or less of gelling agent may be used than mentioned in the above examples, depending on the properties desired in the final product, as has been pointed out above. Likewise, the concentration of the polyvinyl alcohol solution given in the examples may be varied and the concentrations specifically mentioned are merely by way of illustration and not by way of limitation. With mixtures of polyvinyl alcohol and the interpolymeric gelling agents of this invention, wherein the weight ratio of these two components is within the aforesaid range of 1:9 to 9:1, thermal-reversible gels are formed in water solutions of such mixtures wherein the concentration of the interpolymer-polyvinyl alcohol mixture is at least 3%, by weight, although the minimum concentration is preferably 5%. Such gels can be formed from aqueous solutions in which the concentration of the interpolymer-polyvinyl alcohol mixture is as high as 48%, but preferably the concentration for gel formation in such solutions is not substantially higher than 25%.

The pH of the solution of the interpolymer and the mixture thereof with polyvinyl alcohol may range from about 4-9, although the preferred range is from about 4.5-7. If the solution is too acid, the interpolymer will precipitate and no gelling solution will be obtained, whereas if the solution is too alkaline, the interpolymer remains in solution and the mixture does not gel. However, when the pH of the solution is controlled within the range above set forth, gelation thereof takes place. Only a few drops of an alkaline solution are necessary to impart the desired pH of the solution. For this purpose a 5% solution of either ammonium hydroxide, sodium hydroxide, or potassium hydroxide may be used as well as solutions of any alkali metal salts and hydroxides, such as carbonates. Also water-soluble amines, for example, methylamine, ethylamine, triethylamine, and pyridine, have been found suitable for this purpose.

With respect to the preparation of the interpolymer of acrylic acid and α-substituted acrylic acid with their amides, in addition to methacrylic acid and methacrylic amide mentioned in the examples, there may also be used acrylic acid, α-chloroacrylic acid, α-phenyl acrylic acid, and acrylamide, α-phenylacrylamide, α-chloroacrylamide, and the other α-substituted acrylic acids and acrylamides.

In addition to benzoyl peroxide as a catalyst for the interpolymerization action, there may be used other catalysts, such as ammonium persulfate, sodium perborate, percarbonic and perphosphoric acid, hydrogen peroxide, ozonides, or other compounds which release oxygen, and controlled amounts of atmospheric oxygen. The catalyst is generally used in small amounts, ranging from about 0.01-2% by weight of the polymerizable organic compounds. About 0.2% has been found desirable in most instances. The temperature at which the polymerization may be carried out may range from about 20-100° C., although a range of from 60-90° C. is preferable.

While heating the aqueous medium in which the interpolymeric product is dissolved facilitates solution thereof, such solution may be carried out at room temperature if desired by using a stronger alkaline solution and rapid stirring and following with addition of a suitable acid to bring the pH within the gelling range.

The gels which we obtain by our process find many varied uses. One important use is as the protective colloid for photographic silver halide emulsions in place of gelatin. In the form of sheeting, these gels when properly colored may be used for safe-lights or for light filters in photographic equipment. Likewise, the gels may be used as subbing layers. Because of their thermal-reversible properties, such gels as we have described make possible the removal of any soluble salts which may be present therein by merely washing them in cold water and, in addition, permits their ready coating on the material or the support to which they are to be applied by simply heating the gel until it melts to a liquid and then merely applying the liquid in conventional manner. On cooling, the liquid solidifies to a firm, hard and abrasive-resistant coating. Other uses, such as for sizing, adhesives and general coating purposes are evident.

Unlike gelatin and similar natural products, our gelled polyvinyl alcohol may be produced with a definite purity and standardized properties so that there is no variation in different batches.

We claim:

1. A firm thermal-reversible aqua-gel having a pH of 4-9, containing, as the gel-forming constituents thereof, a water soluble polyvinyl alcohol and an interpolymeric product obtained from a compound selected from the group consisting of acrylic acid and α-substituted acrylic acids with an amide of said acids in which the respective amounts of said acids and of said amide are each at least 25% by weight of the interpolymer, the weight ratio of the amounts of polyvinyl alcohol and of said interpolymeric product being within the range of 1:9 to 9:1.

2. A firm thermal-reversible aqua-gel having a pH of 4.5-7, containing, as the gel-forming constituents thereof, a water soluble polyvinyl alcohol and an interpolymerization product of methacrylic acid with methacrylamide in which the respective amounts of said acid and of said amide are each at least 25% by weight of the interpolymer, the weight ratio of the amounts of polyvinyl alcohol and of said interpolymerization product being within the range of 1:9 to 9:1.

3. A firm thermal-reversible aqua-gel having a pH of 5-6.5, containing, as the gel-forming constituents thereof, a water soluble polyvinyl alcohol and an interpolymerization product of substantially equal amounts of methacrylic acid and methacrylamide, the weight ratio of the amounts of polyvinyl alcohol and said interpolymerization product being within the range of 1:9 to 9:1.

4. A firm thermal-reversible aqua-gel having a pH of 6-7, containing, as the gel-forming constituents thereof, a water soluble polyvinyl alcohol and an interpolymerization product of substantially equal amounts of methacrylic acid and methacrylamide, the weight ratio of the amounts of polyvinyl alcohol and said interpolymerization product being within the range of 1:9 to 9:1.

5. A firm thermal-reversible aqua-gel having a pH of 5-6.5, containing, as the gel-forming constituents thereof, a water soluble polyvinyl alcohol and an interpolymerization product of methacrylic acid, methacrylamide and methyl acrylate in which the respective amounts of said acid and said amide are each at least 25% by weight of the interpolymer and the amount of methyl acrylate is less than either of the other components, the weight ratio of the amounts of polyvinyl alcohol and of said interpolymerization product being within the range of 1:9 to 9:1.

CARL E. BARNES.
WILLIAM O. NEY, Jr.

REFERENCES CITED

The following references are of record in the file of this patent:

UNITED STATES PATENTS

| Number | Name | Date |
| --- | --- | --- |
| 2,249,537 | McDowell et al. | July 15, 1941 |

OTHER REFERENCES

Lewis et al.: Industrial Chemistry of Colloidal and Amorphous Materials, McMillan, 1943, page 229.